Sept. 19, 1972   T. OHKAWA   3,692,626
APPARATUS FOR FORMING AND CONTAINING PLASMA
Filed March 21, 1969   3 Sheets-Sheet 1
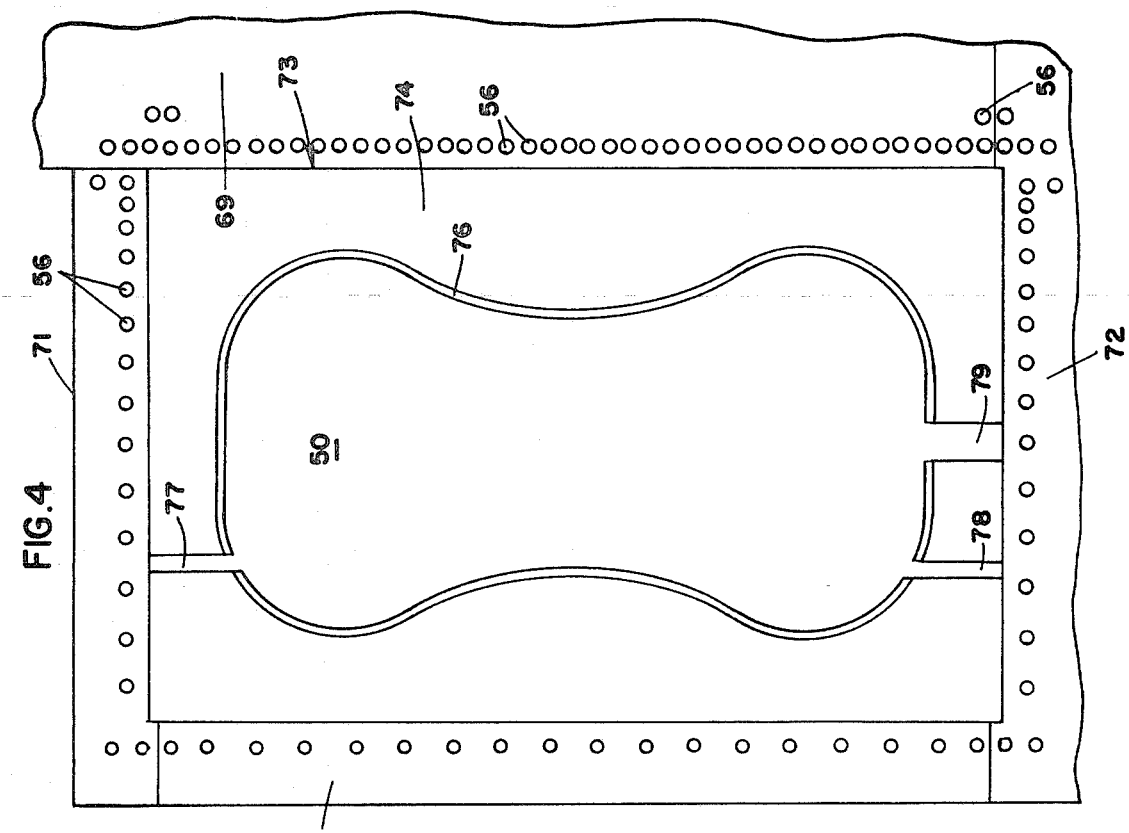
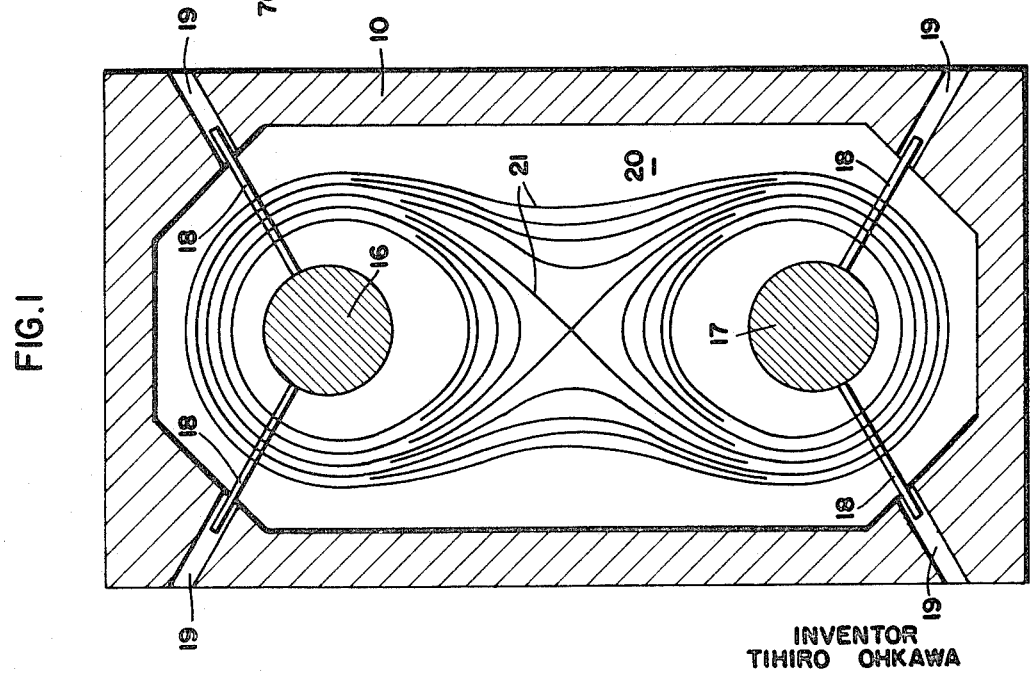
INVENTOR
TIHIRO OHKAWA
Anderson, Luedeka, Fitch, Even, & Tabin
ATTYS.

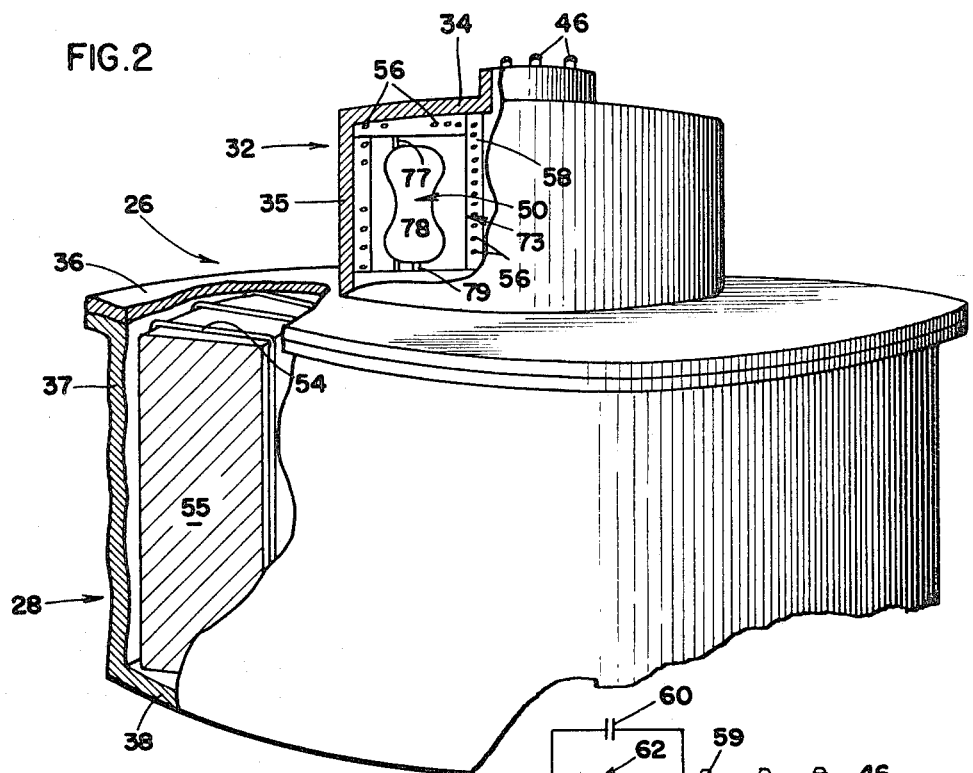

INVENTOR
TIHIRO OHKAWA

ATTYS.

United States Patent Office 3,692,626
Patented Sept. 19, 1972

3,692,626
APPARATUS FOR FORMING AND CONTAINING PLASMA
Tihiro Ohkawa, La Jolla, Calif., assignor to the United States of America as represented by the Atomic Energy Commission
Filed Mar. 21, 1969, Ser. No. 809,280
Int. Cl. G21b 1/00
U.S. Cl. 176—3
8 Claims

ABSTRACT OF THE DISCLOSURE

A plasma method and apparatus is provided with a toroidal palsma confinement region in which a toroidal magnetic field is produced by external magnetic field producing means. A toroidal electrical field is induced within the region by conductors disposed outside of the plasma region so as to produce and maintain a plasma current. The electrical field is produced without producing any substantial additional magnetic field in the region. A second magnetic field in the region is produced by means disposed outside the region so as to provide a plurality of nests of closed toroidal flux surfaces in the toroidal plasma region, thus approximating a field produced by conductors within the region without the losses associated therewith.

---

This invention relates generally to methods and apparatus for producing, confining and otherwise manipulating plasma and, more specifically, to an improved plasma method and apparatus with which plasma may be produced and confined in a region entirely free of solid equipment components.

In recent years various types of plasma apparatus have been developed for producing and confining electrical plasmas, i.e., ionized gases comprising approximately equal numbers of positively charged ions and free electrons at high temperatures. If a plasma is formed from a suitable gas or mixture of gases such as deuterium or tritium, fusion reactions may occur within the plasma body. Such fusion reactions may produce highly energized protons, neutrons or other particles. If the proper conditions are realized the energy obtained from the fusion reactions may exceed the input energy and provide useful power.

In order to achieve such results it is necessary to provide a suitable means of producing and confining the plasma in a given region at high temperature for an appreciable period of time. Such confinement of plasma is difficult to achieve with ordinary solid walled containers, since contact of the plasma ions with the walls of such a container cools the plasma. A solution to such plasma confinement problems is to provide suitable magnetic or electrical field configurations with which the plasma may be confined.

One type of geometrical configuration for a plasma apparatus which has received a great deal of attention is that of an endless tube such as a toroid in which, of course, there can be no end losses of plasma or energy to the environment. Such geometry has been utilized in apparatus in which a magnetic field along the minor axis of the toroid is imposed by currents in conductors located outside of the plasma chamber. This approach has been used in the United States built device known as a "Stellarator" and in the Russian "Tokamak" device. Problems of plasma stability in these devices have not been entirely solved, however. Toroidal configurations have also been used with "multipolar" plasma apparatus in which a plurality of conductors are positioned within a toroidal plasma region, these conductors being spaced around the toroid's minor axis and having the same major axis as the plasma region. The conductors have been referred to either as providing poles of the magnetic field or magnetic axes, since each conductor may be surrounded by nests of closed flux surfaces, i.e., imaginary surfaces on which the magnetic flux is the same at all points.

Generally, Kerst and Ohkawa U.S. Pat. No. 3,194,739 discloses apparatus which includes a toroidal corrugated jacket of a conductive material such as copper which encloses a plurality of rods of conductive material such as copper spaced about the minor circumference of a toroidal plasma confinement space. A current in one direction is produced in the rods which produces magnetic multipolar fields in the confinement space and also induces an oppositely directed current in the adjacent wall of the jacket. The wall of the jacket is so shaped relative to the rods that this image current also produces multipolar magnetic fields resulting in net fields which effectively confine plasma. The apparatus shown in the cited patent is a twelve pole device utilizing six rods placed between six ridges of the jacket, each rod and each ridge constituting a pole. However, as few as two rods have been utilized, forming a quadrupole apparatus.

A significant problem with such devices has been the presence of the internal rods or conductors and the structures that support them within the plasma confinement region. The plasma can come in contact with these structures and thereby become cooled. Yet the presence of the conductors and their supports in the plasma confinement region has appeared to be essential.

In the present invention this problem is solved by providing a plurality of field producing means, all of which are positioned outside of a toroidal plasma region but which provide a multipolar magnetic field which approximates that produced using conductors within the region. More specifically, a magnetic field producing means may be, as specifically illustrated, an azimuthally symmetrical conductive housing surrounding both the primary winding and core of a transformer and the plasma confinement region, providing a generally toroidal magnetic field within the confinement region. Within the housing are provided a large number of conductive rings which are also outside the plasma region and extend around the region. Currents in the conductive rings provide a toroidal electrical field in the plasma region so as to produce and maintain a plasma current in the region. A conductive jacket substantially surrounds the plasma region and is so shaped as to produce a magnetic field in the region having a desired configuration, namely that of a multipolar field, one with a plurality of nests of flux surfaces within the plasma region. Thus, plasma losses by contact with internal conductors occurring in prior art multipolar devices are eliminated. Alternatively and as also illustrated, a plurality of additional conductive rings or coils outside of the confinement region may be susbtituted for the conductive jacket.

It is, therefore an important object of this invention to provide an improved method and apparatus for producing and confining plasma.

A further object of this invention is to provide a plasma apparatus in which the various physical components providing the confining fields are located outside of the confinement region.

Another object of invention is to provide a method and apparatus for confining plasma which will minimize plasma losses by cooling.

Still another object of this invention is to provide an apparatus for producing and confining plasma which produces a predetermined magnetic field directly dependent only upon accurate assembly of a simple configuration of conductors.

Other objects and advantages of this invention will become apparent from the following description, considered in conjunction with the accompanying drawings, in which:

FIG. 1 is a diagrammatic view of a portion of a prior art plasma apparatus utilizing internal conductors;

FIG. 2 is a perspective view of a plasma apparatus utilizing the present invention, with portions being broken away to show certain features;

FIG. 3 is a partially diagrammatic vertical cross sectional view of a portion of the apparatus shown in FIG. 2, i.e., along a plane bisecting said apparatus;

FIG. 4 is a detailed diagrammatic view of a part of the apparatus shown in FIG. 3 showing the location of the external conductors;

Figure 5:
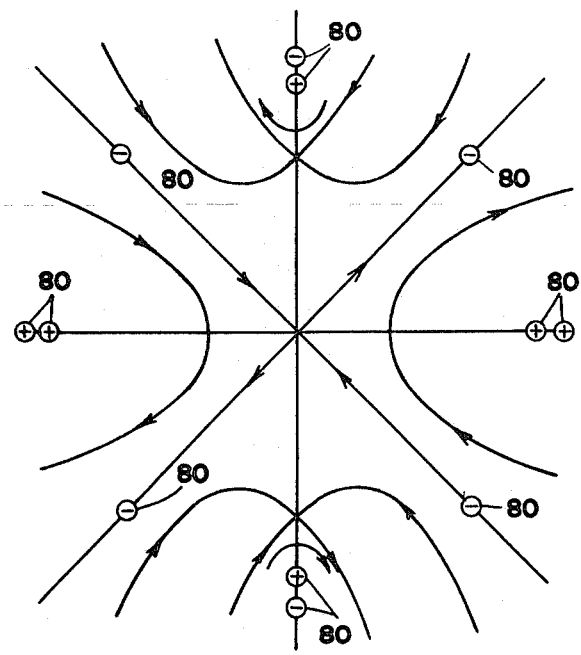
FIG. 5 is a diagrammatic view of an alternative means of producing a linear plasma confining field, showing such a field as would be produced in a vacuum in the absence of a plasma.

In order to compare the present invention with the prior art, a typical prior art plasma apparatus is shown in FIG. 1, which is a diagrammatic cross sectional view through one side of a toroidal quadrupole plasma confining apparatus. A hollow conductive jacket 10 is provided which is generally vertically elongated and has disposed in vertically spaced relationship conductive rods 16 and 17. The rods 16 and 17 are maintained in a spaced position from the jacket 10 by supporting pins 18 which may be retractable into slots 19 in the jacket. A power source (not shown) is utilized to produce currents around the toroid in the rods 16 and 17 which, in turn, induce oppositely directed currents in the jacket 10. Thus, current may be directed into the plane of the figure in the rods and out of the plane of the figure in the jacket. The magnetic field configuration resulting from the shapes and positions of the jacket 10 and rods 16 and 17 which serves to confine the plasma in equilibrium in the region 20 within the jacket is shown by the flux surfaces 21. It is such a field which is approximated in the specific apparatus shown in the remainder of the drawings but by use of conductors positioned outside of the plasma confinement region and without the use of internal conductors.

In FIGS. 2, 3 and 4 a specific plasma apparatus is illustrated showing various features of the present invention. Generally the illustrated structure includes a housing 26, formed of conductive materials and electrically insulated from its environment, which functions as part of the means for producing a toroidal magnetic field as will shortly become apparent. The housing includes a toroidal lower portion 28 with a large central opening 30 and an upper portion in the form of a cylinder 32 which is positioned in large part over the central opening 30 for ease of access thereto through the opening. In order to provide a continuous current path along the surfaces of the housing 26, the top wall 34 and outside wall 35 of the cylinder 32 are integral with the upper wall 36 of the toroid 28 and the outer wall 37, bottom wall 38 and inner wall 39 of the toroid are integral with the bottom wall 40 of the cylinder 32.

A radially symmetrical current path is provided by electrically interconnecting the top and bottom walls of the cylinder 32 through a conducting rod 44 centrally positioned in the cylinder by a plurality of connecting prongs 46 inserted in mating apertures 48 of the respective surfaces of the cylinder. As illustrated, the portion 49 of the lower surface 40 of the cylinder 32 which is engaged by the rod 44 is removable for access to the inside of the cylinder 32. It may be seen that the bottom wall 40 of the cylinder 32 and the outer wall 35 thereof almost touch one another but are insulated from one another so that the cylinder includes a region almost completely surrounded by conductive walls which form part of a conductive path also surrounding the toroidal lower portion 28 of the housing.

Within the cylinder 32 is a toroidal plasma confinement region 50 in which a toroidal magnetic field is provided by the current in the walls of the cylindrical housing 32 and central rod 44. This field is provided by a power source 51 such as a capacitor bank. The source 51 is connected through external connectors 52 and switch means 53, such as a thyratron, to a toroidal primary transformer winding 54 which is wound about a magnetic core 55 positioned within and insulated from the lower portion 28 of the housing 26. It may be readily observed that discharge of the capacitor bank 51 through the primary winding 54 will induce a current in the housing 26 which will thus constitute a single turn, azimuthally symmetrical secondary winding of a transformer. Since the secondary current travels generally around the minor circumference of the toroidal plasma region 50, the magnetic field resulting therefrom will also be generally toroidal, i.e., parallel to the minor axis of the toroidal plasma confinement region 50.

A toroidal electric field is provided in the plasma confinement region 50 by conductive electric field producing means which as illustrated comprises a plurality of series connected conductive rings 56 positioned in a predetermined manner, as shown in FIG. 4, outside of the plasma region anl electrically insulated from one another by a supportive insulating body 58. The conductors extend around the toroid parallel to its minor axis, i.e., perpendicular to the radial cross section shown in FIG. 3. The conductors 56 are electrically connected to a power source such as the illustrated capacitor bank 60 through external connectors 59 and switch means 62. Upon closure of the switch means 62, a current passes through the conductors 56 and produces a magnetic field. Since the changing magnetic flux encircles the plasma confinement region 50, an electrical field $E_\phi$ is induced within the region. This field may be utilized to ionize a gas within the region and heat it, thus creating a plasma, and to cause electrical currents in the plasma. As illustrated, for ease of assembly, the supporting insulative body 58 is formed of four insulative portions, a central cylinder 69, an outer cylinder 70, a top plate 71 and bottom plate 72.

The plasma confinement region 50 is defined by a hermetically sealed toroidal plasma confinement chamber 73 which as illustrated is defined by a container or jacket 74 formed of a conductive material such as copper and insulating layer 76 which substantially surrounds the confinement region and functions as a means for shaping the magnetic field. The jacket is split by apertures 77 and 78, as set forth hereinafter along a vertical azimuthal or radial plane and also along a vertical cylindrical surface into four portions which are electrically insulated from one another. The vertical cylindrical split permits the toroidal magnetic field provided by the current in the walls of the cylinder 32 to be admitted to the region 50. The azimuthal split which may, for example, be in the plane of FIGS. 3 and 4, admits the toroidal electric field $E_\phi$ to the region 50. The jacket is so shaped that its inner walls conform to a flux surface of a predetermined multipolar magnetic field configuration. As previously noted, to produce such a multipolar field, electrical currents will be produced in a plasma within the jacket. In order to prevent the flow of current to the container walls, it is necessary to cover the walls with an electrically insulating layer 76. Such layer 76 may comprise a thin layer of alumina or of ceramic coating over a base of glass and is provided at all points which may be contacted by the plasma in operation of the apparatus.

In some applications a separate vacuum tight vessel of a dielectric such as glass, or a metal such as stainless steel with high electric resistivity might be placed within the jacket. However, the illustrated embodiment utilizes the conductive jacket 74 as the major portion of the hermetically sealed chamber 73 for greater strength than is provided by a separate vessel and only the aforementioned thin layer of insulation need be utilized.

As previously mentioned, in order to permit production of the toroidal magnetic and electric fields within the plasma region 50 by the external conductive rings 56, the conductive jacket 74 is split into four portions. The vertical cylindrical split is provided by top and bottom apertures 77 and 78 in the jacket 74 which are vertically aligned and extend entirely around the toroid. The slots are filled with a suitable gas-tight electrical insulator which comprises a portion of the hermetically sealed chamber 73. The plasma currents in the plasma region 50 in turn induce an image current in the conductive jacket 74 which produces a magnetic field in the confinement region 50 having the desired configuration. The configuration of the magnetic field depends upon the distribution of external current and the parameters of the jacket, and these may be calculated, given the desired magnetic field. A distribution of identical conductors 56 carrying equal currents which approximates a desired continuous distribution of currents will be described below in connection with a specific example.

The jacket is also provided with a gas pumping port 79 through which the plasma region 50 may be evacuated and also through which gas such as hydrogen is admitted to form the plasma. In operation, it is preferred that the plasma region 50 be evacuated to below $10^{-6}$ torr before the gas to form the plasma is introduced. The toroidal magnetic field is then produced by energizing the primary transformer winding 54 by closing the switch 53. The magnetic field begins to build up and at about the time it approaches its peak the electric field $E_\phi$ is produced by closing the switch 59 thus discharging the power source 60 through the rings 56. The plasma is formed by the breakdown of the gas due to the action of the toroidal electric field.

An understanding of the advantages of the nested flux-surfaces produced by this apparatus may best be understood by initially considering the mathematical description of a linear (as opposed to a toroidal) axially symmetric plasma equilibrium in which there exists more than one magnetic axis. Some of these axes are hyperbolic and some are elliptic. They can be arranged to have configurations similar to multipole configurations with internal conductors. The flux function, $\psi$, is defined by $$B_x = \frac{\partial \psi}{\partial y}$$

$$B_y = -\frac{\partial \psi}{\partial x} \quad (1)$$

Then, the equilibrium condition $$\nabla p = \vec{j} \times \vec{B} \quad (2)$$

becomes $$\nabla^2 \psi + \frac{df(\psi)}{d\psi} = 0 \quad (3)$$

where $$f(\psi) = 4\pi p(\psi) + \frac{B_z^2(\psi)}{2} \quad (4)$$

where $B_x$, $B_y$, $B_z$ are components of a magnetic field B, p=pressure and $\vec{B}$=magnetic field vector.

The pressure and the longitudinal field are constant on a flux line. The simplest example is the case with a uniform current, $$f(\psi) = f_0 + 4\pi j_0 \psi \quad (5)$$

where $j_0$ is the current density. Then Eq. 3 becomes $$\nabla^2 \psi + 4\pi j_0 = 0 \quad (6)$$

The general solution of Eq. 6 is given by $$\psi = -\pi j_0 (x^2 + y^2) + \mathcal{R}e\, g(x+iy) \quad (7)$$

where $g(x+iy)$ is a function without any singularity inside the plasma region if there are no conductors within the plasma region.

A magnetic axis is defined by $$\frac{\partial \psi}{\partial x} = \frac{\partial \psi}{\partial y} = 0 \quad (8)$$

It is elliptic or hyperbolic depending on the inequality given by $$\frac{\partial^2 \psi}{\partial x^2} \frac{\partial^2 \psi}{\partial y^2} - \left(\frac{\partial^2 \psi}{\partial x \partial y}\right)^2 \gtrless 0 \quad (9)$$

A multipole like configuration may be produced by a proper combination of a magnetic field produced by means outside of the plasma region and plasma current. For example, a quadrupole-like configuration can be produced by a magnetic field in a vacuum designated as $g(x+iy)$ representing superimposed quadrupole and octopole fields due to external windings:

$$\mathcal{R}e\, g = I_2(x^2 - y^2) - I_4(x^4 - 6x^2y^2 + y^4) \quad (10)$$

Figure 6:
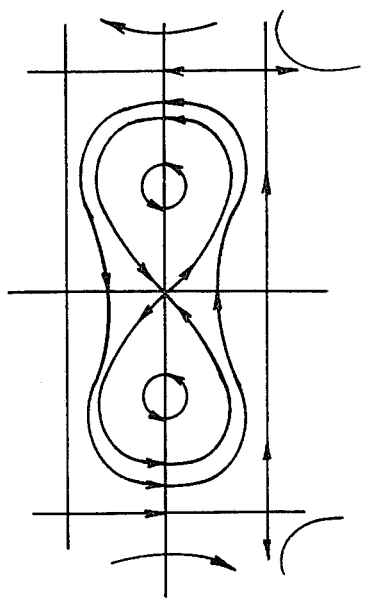
FIG. 6 is a diagram of the magnetic field shown in FIG. 5, as modified by the presence of a plasma.

A sketch of this field and the associated configuration of conductors 80 is shown in FIG. 5. The current necessary to produce this field in typical devices may be of the order of 50,000 to 100,000 amperes. FIG. 6 shows the effect of a plasma current on the field in FIG. 5.

Then we have seven magnetic axes at (a) $\quad x=0, \quad y=0$ (b) $\quad x=\pm\sqrt{\frac{I_2-\pi j_0}{2I_4}},\ y=0$ (c) $\quad x=\pm\frac{I_2-\pi j_0}{8I_4},\ y=\pm\sqrt{\frac{2\pi j_0 - I_2}{8I_4}} \quad (11)$ If one chooses $$0 < \pi j_0 < I_2 < 2\pi j_0$$
$$0 < I_4 \quad (12)$$

then the axes at (b) are elliptic and the rest are hyperbolic. The values of $\psi$ at the axes are given by at (b) $\psi = \frac{(I_2 - \pi j_0)^2}{4I_4}$ at (a) $\psi = 0$ and at (c) $\psi = \frac{1}{8I_4}(I_2^2 - 2)(\pi j_0^2) \quad (13)$ In order to have a quadrupole-like configuration, it is necessary to have $$I_2^2 - 2(\pi j_0)^2 < 0 \quad (14)$$

The external field may be replaced by a conducting wall placed on a flux surface, and in the toroidal apparatus described herein, this is done with the conductive jacket. The wall current will then adjust itself to give the configuration, independently of any plasma current.

The magnetohydrodynamic stability of such a system may be analyzed as follows. Three modes of instability must be considered: interchange driven by $\nabla p$; kink that may become unstable with $\nabla p=0$; and the mode in which the plasma currents try to pull each other closer. The interchange mode and the kink mode are similar to the Tokamak case. The magnetic well and the shear stabilize the interchange and the kink with large $m$ number. The low-$m$ kink modes are stabilized by staying below the Kruskal-limit. The third mode is unique for the configuration. We shall examine this mode by using the energy principle.

We use the coordinate system $(\psi z\chi)$ given by $$\nabla = B\frac{\partial}{\partial \psi}, \frac{\partial}{\partial z}, \frac{1}{JB}\frac{\partial}{\partial \chi} \quad (15)$$

Then the equilibrium conditions become $$j_z = -\frac{1}{J}\frac{\partial}{\partial \psi}(JB^2)$$

$$f' = -\frac{B}{J}\frac{\partial}{\partial \psi}(JB^2) \quad (16)$$

The displacement, $\vec{\xi}$, for this mode is $$\vec{\xi}$$

$$\vec{\xi}(\xi_x, 0, \xi_\chi) \quad (17)$$

Then the energy integral for incompressible displace is given by (after minimizing with respect to $\xi_\psi$)

$$\delta W = \frac{\pi}{2}\int d\psi d\chi \left(\frac{1}{JB^2}\right)\left\{\frac{\delta(B\xi_\psi)^2}{\delta \chi}\right\}^2 + f'DJ(B\xi_\psi)^2$$

$$+ JB^2\left\{\frac{\partial(B\xi_\psi)}{\partial \psi} + \frac{(B\xi_\psi)}{B^2}f'\right\}^2 \bigg) \quad (18)$$

where $$D = \frac{\partial \ln J}{\partial \psi} - \frac{f'}{B^2} = -\frac{2}{B^2}\frac{\partial}{\partial \psi}\left(f + \frac{1}{2}B^2\right) \quad (19)$$

and $$B^2 = B_x^2 + B_y^2 \quad (20)$$

Note that the longitudinal field does not appear except through $f$. If there is no conducting wall, then the worst displacement is the one that makes the last term vanish. In a configuration such as shown in FIG. 5, the second term is negative at least somewhere. The first term is smaller by the ratio between line length and pressure gradient length, since the magnetic fields due to the plasma current and the external current are comparable. We shall drop the first term and rewrite the rest as $$\delta W = \frac{\pi}{2}\int d\psi d\chi \left\{ JB^2\left(\frac{\partial(B\xi_\psi)}{\partial \psi}\right)^2 - (B\xi_\psi)^2 Jf'' \right\} \quad (21)$$

For the cases with uniform currents, we have $f'' = 0$. Therefore, the configuration is stable against the MHD mode where the motion is two dimensional.

The toroidal effects of the presents apparatus will distort the configurations shown in FIGS. 5 and 6. By using cylindrical coordinates $(R, \phi, z)$ and defining flux function $\psi$ by $$B_R = -\frac{1}{R}\frac{\partial \psi}{\partial z}, B_z = \frac{1}{R}\frac{\partial \psi}{\partial R} \quad (22)$$

the equilibrium equation becomes $$R\frac{\partial}{\partial R}\left(\frac{1}{R}\frac{\partial \psi}{\partial R}\right) + \frac{\partial^2 \psi}{\partial z^2} + \frac{d}{d\psi}\left(\frac{(RB_\phi)^2}{2}\right) + R^2 \frac{d}{d\psi}(4\pi p) = 0 \quad (23)$$

where $RB_\phi$ and $p$ are functions of $\psi$. In the low $\beta$ limit, the R-dependence of the last term may be neglected and we have $$R\frac{\partial}{\partial R}\left(\frac{1}{R}\frac{\partial \psi}{\partial R}\right) + \frac{\partial^2 \psi}{\partial z^2} = -\frac{d}{d\psi}f(\psi) = -4\pi J_\phi R \quad (24)$$

where $$f(\psi) = \frac{(RB_\phi)^2}{2} + 4\pi R_0^2 P$$

We shall assume that the current density, $j_\phi$, is proportional to $R^{-1}$, or equivalently, that $f(\psi)$ is a linear function of $\psi$.

Then Eq. 24 becomes $$R\frac{\partial}{\partial R}\frac{1}{R}\frac{\partial \psi}{\partial R} + \frac{\partial^2 \psi}{\partial z^2} + 4\pi j_0 R_0 = 0 \quad (25)$$

where $j_0$ is the average current density.

Then a configuration corresponding to the one given by Eq. 7 is expressed by $$\psi = -\pi j_0 R_0 \{(R/R_0)^2 \ln(R/R_0) - (\tfrac{1}{2})(R/R_0)^2$$
$$+ \tfrac{1}{2} + (z/R_0)^2\}$$
$$+ J_2\{(R/R_0)^2 \ln(R/R_0) - (\tfrac{1}{2})(R/R_0)$$
$$+ \tfrac{1}{2} - (z/R_0)^2\}$$
$$+ J_4[24\{(\tfrac{1}{16})(R/R_0)^4 \ln(R/R_0) - (\tfrac{5}{64})(R/R_0)^4$$
$$+ (\tfrac{1}{8})(R/R_0)^2 \ln(R/R_0) + (\tfrac{1}{16})(R/R_0)^2 + (\tfrac{1}{64})\}$$
$$- 12(z/R_0)^2\{(\tfrac{1}{2})(R/R_0)^2 \ln(R/R_0)$$
$$- (\tfrac{1}{4})(R/R_0)^2 + \tfrac{1}{4}\} + (z/R_0)^4] \quad (26)$$

Figure 7:
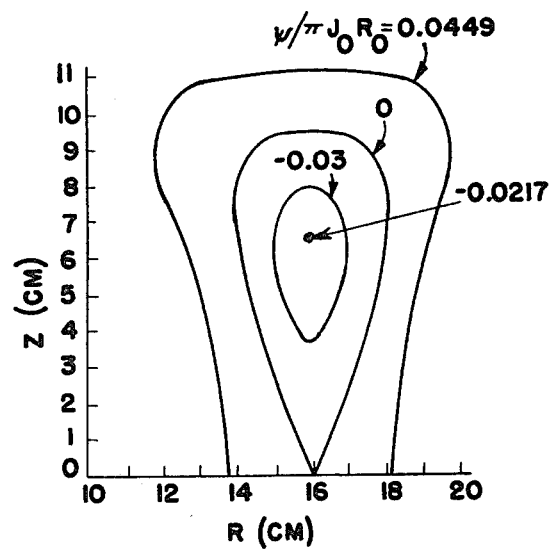
FIG. 7 is a diagram showing flux surfaces in a toroidal plasma confinement region.

The above expression is reduced to the one given by Eq. 7 in the limit $R_0 \to \infty$. The R-dependence of the last term in Eq. 23 may be taken into consideration by adding a term given by $-(R^4/8)(dp/d\psi)$, where $dp/d\psi$ is assumed constant. Flux surfaces produced by such a field are shown in FIG. 7.

In order for the plasma to have magnetohydrodynamic stability in such a toroidal configuration, the Kruskal-Shafranov criterion must be satisfied, i.e., $$B_\phi \frac{\mu_0 j_0 R_0 q}{2}$$

where $B_\phi =$ the toroidal magnetic field at a magnetic axis of radius $R_0$
$j_\phi =$ current density
$q =$ the stability margin.

For stability $q$ should be substantially larger than one. If $j_\phi$ and $R_0$ are known the maximum magnetic field $B_\phi$ can be calculated.

The current density, $j_\phi$, depends on the induced toroidal electric field, $E_\phi$, and on the plasma resistivity, which is a function of temperature.

The design of a specific embodiment of a plasma apparatus utilized for plasma research in accordance with FIGS. 2-4 takes account of the fact that the necessary measurement of gradients of magnetic field and density within the plasma confinement region with existing sensors requires a plasma radius at least of the order of 5 cm. In order for magnetohydrodynamic stability to be studied, the fields produced must be approximately constant for a sufficient period of time of instabilities to appear and develop, i.e., several hundred microseconds.

In a special embodiment a toroidal plasma confinement chamber is provided having a vertical dimension of 25 cm., a horizontal dimension of approximately 6 cm. and a major radius of 16.2 cm. The pressure of the hydrogen injected into the jacket is about 5 microns and the density is about $3.5 \times 10^{14}$ atoms-cm.$^{-3}$. The upper portion 32 of the housing has an inner radius of 5.5 cm. and the conductive rod 44 has a radius of slightly less than 5.5 cm. The transformer i.e., core is formed in six sections, a stack of six sections, with a total height of 45.8 cm. and a thickness of 20.7 cm. thick. The major radius of the transformer core is 37.55 cm. The transformer primary winding comprises 97 turns. The conductive jacket 74 is formed of copper with an inner surface layer 76 of alumina. The walls of the housing and the conductive rod are formed of thick copper. In such a configuration, assuming the current in the rod 44 and cylindrical housing 32 is a surface current with a depth of ½ cm., the inductance of the secondary circuit may be calculated to be 0.12 microhenry. The total secondary flux of such an embodiment is calculated to be 0.077 weber and the field energy to be 25 kilojoules.

The period of the applied current may be chosen to be $8 \times 10^{-3}$ sec. This is large enough that $B_\phi$ is constant to within $\pm 5\%$ for 1 msec., during which time the plasma can be produced and studied. With 97 primary turns on the transformer, one obtains values of 1500 microfarads and 7200 volts for the capacity and the condenser voltage respectively.

The secondary turn resistance is $16 \times 10^{-6}$ ohm, and the resistance of the 97-turn primary winding, viewed from the secondary circuit, is below $3 \times 10^{-6}$ ohm. Thus, the resistance damping constant is about $10 \times 10^{-3}$ sec., which means that the peak field, $B_\phi$, will be reduced by 20%. This reduction can be compensated for by increasing the capacitor voltage of the power source 51 to 9000 v. with a consequent increase in the core flux to about 0.1 weber and a primary current of 10 kiloamps.

An important consideration is the electrical connection that must be made between the center rod and the housing after the plasma cavity is put in place. The resistance of the connection must be less than a few microohms for a secondary current of 640 kiloamps.

The electrical field $E_\phi$ is produced by 100 conductors 56 of No. 6 gauge wire. The current for each conductor is 3.5 kiloamps for a capacitor bank 60 having a capacity of 1400 microfarads and a potential of 2000 volts. The stored energy is 2.8 kilojoules.

The conductor resistance is the major contributor to the resistive damping time constant. This time constant can be considerably improved by inserting an external inductance in the circuit and increasing the voltage. If the condenser voltage of capacitor bank 60 is increased to 8000 volts, the external inductance can be $1.2 \times 10^{-3}$ henries, and the capacity can be reduced to 380 microfarads. The stored energy is 12.2 kilojoules. The resistance of the external inductance can be made less than $100 \times 10^{-3}$ ohm and the resistive damping time constant longer than $12 \times 10^{-3}$ sec. The voltage wave form may also be improved by using additional inductances in the condenser bank.

The toroidal electric field is produced in such a way that a minimum unwanted magnetic field is produced inside the plasma region. There are two ways to do this, both of which require that the metallic plasma container be cut in a vertical plane to allow the electrical field to appear inside the container. One could apply a potential difference, from a condenser bank, for example, between the two sides of the apertures 77 as is done in some thetapinch tubes. The method is unattractive here, because the inductance of the load is so small that an enormous condenser bank would be necessary to obtain an appreciable period for the field. If a transformer were used to increase the impedance, the secondary would have to handle inconveniently large currents. In addition, special precautions would have to be taken to feed the current into the gap in such a way as not to induce large-error magnetic fields.

The means of producing substantially no magnetic field in the chamber 50 which is preferred however is to induce the toroidal electric field by the flux produced by the toroidal currents flowing in the conductive rings placed along the outside of the plasma container. If the position of the currents is correct, an electric field can be induced inside without an unwanted magnetic field. All the magnetic flux encircles the plasma, and it is the change in this flux that induces the electric field. The inductance of the circuit is increased by the square of the number of rings over that for the calculated single-turn inductance of $0.045 \times 10^{-6}$ h., with a consequent reduction in condenser bank size. A period of $5 \times 10^{-3}$ sec. is large enough to ensure that the electric field is roughly constant over the time of interest, several hundred microseconds.

The distribution of a sheet of curent necessary to produce the electric field with no magnetic field inside the plasma cavity may be calculated, as by a computer. The positions of 100 conductive rings 56 of current, which approximates the calculated distribution, are shown in FIG. 4.

The conductors are spaced vertically 1.2 cm. apart along the supporting insulative body 58 at a distance of 0.5 cm. from the jacket 74. Along the inner circumference the vertical spacing is 0.5 cm., at respective distances from the jacket of 1.0 cm. and 1.7 cm. Along the top and bottom of the jacket the spacing gradually increases from that of the inner circumference to that of the outer.

It may be seen that the field configuration with the plasma approximates that shown in FIG. 1 but avoids any conductors being positioned in the plasma confinement region, thus avoiding undesired cooling of the plasma by contact with solid objects. Furthermore, the configuration is dependent only upon the geometrical relationships of the conductors and the jacket so as to simplify production of a predetermined field configuration.

Plasma may be produced as well as confined in the device by utilizing the toroidal electric field $E_\phi$ produced by the conductors 56 to drive current along the toroidal magnetic field lines, ionizing a gas in the plasma region and heating it by ohmic losses. The equilibrium temperature reached in such production of plasma is determined by the balance between the power delivered to the plasma by the fields and power lost from the plasma due to optical radiation, from impurities and the continuous interchange of neutral gas from the walls of the jacket 74 with the plasma. Representative parameters of the specific embodiment previously described are an electron temperature of the order of 5 electron volts, a gas density $n$ of about $5 \times 10^{14}$ ions per cubic centimeter and a current density $j$ of about 200 amps/cm.$^2$, produced with an electric field of one volt/cm., a toroidal magnetic field of 5000 gauss and a magnetic field produced by the conductive rings, jacket and plasma current about the magnetic poles of 500 gauss.

Various features of the invention are set forth in the accompanying claims.

What is claimed is:

1. Apparatus for forming and containing plasma comprising:
    means defining a toroidal plasma confinement region, said means including a generally rectangular conductive toroidal jacket defining a chamber containing said confinement region and having opposing relatively elongated side portions constricted toward each other for forming a first magnetic field in said confinement zone, said jacket further defining insulative apertures along a vertical cylindrical surface and along a vertical azimuthal or radial plane to permit admission of magnetic and electrical fields into said confinement region;
    means including a first conductive housing circumjacent said toroidal jacket together with power supply means arranged for applying electrical current to flow radially about said housing to generate a toroidal magnetic field within said plasma confinement region; and
    means including a plurality of electrical series connected ring conductors distributed concentrically with respect to said jacket and parallel to the minor axis thereof together with power source means for applying an electrical current to said ring conductor for generating an electrical field in said confinement region; said first magnetic and said toroidal magnetic fields interacting to provide a plurality of nests of closed toroidal magnetic flux surfaces defining said plasma confinement region.

2. A plasma apparatus according to claim 1 wherein said toroidal conductive jacket's inner surface is coincident with a magnetic flux surface.

3. A plasma apparatus according to claim 1 wherein an insulating material layer is disposed to cover the inner walls of said jacket.

4. A plasma apparatus according to claim 3 wherein said power supply comprises a transformer with a toroidal core within a second conductive housing, said housing disposed coaxially with respect to said first housing and serving as a secondary interconnected with said first housing for applying said electrical current thereto.

5. A plasma apparatus according to claim 4 wherein said power supply comprises a capacitor bank and switch means for applying electrical current to the primary winding of said transformer.

6. Apparatus according to claim 5 wherein said power source means comprises a capacitor bank and switching means for applying said electrical current to said plurality of electrical ring conductors.

7. Apparatus according to claim 6 including means for injecting hydrogen into said jacket with a density of about $3.5 \times 10^{14}$ atoms-cm.$^3$ to form said plasma.

8. Apparatus as according to claim 7 wherein said plasma has a density of about $5 \times 10^{14}$ ions per cubic centimeter, a current density of about 200 amps/cm.$^2$ produced by an electric field of about one volt/cm., a toroidal magnetic field of about 5000 gauss and a magnetic field produced by the conductive rings, said jacket and plasma current about the magnetic poles of said field of about 500 gauss.

References Cited
UNITED STATES PATENTS

| | | | |
|---|---|---|---|
| 3,156,621 | 11/1964 | Josephson | 176—1 |
| 3,258,401 | 6/1966 | Kerst | 176—1 |
| 3,278,384 | 11/1966 | Lenard et al. | 176—1 |
| 3,508,104 | 4/1970 | Braams | 176—1 |

REUBEN EPSTEIN, Primary Examiner

U.S. Cl. X.R.

176—5